(12) United States Patent
Yuyama et al.

(10) Patent No.: US 6,616,010 B2
(45) Date of Patent: Sep. 9, 2003

(54) MEDICINE FEEDER APPARATUS

(75) Inventors: Shoji Yuyama, Toyonaka (JP); Yasuhiro Shigeyama, Toyonaka (JP); Ayumu Saito, Toyonaka (JP); Akitomi Kohama, Toyonaka (JP); Masahiko Kasuya, Toyonaka (JP); Masaki Tujita, Toyonaka (JP)

(73) Assignee: YuYama Mfg. Co., Ltd., Toyonaka (JP)

( * ) Notice: Subject to any disclaimer, the term of this patent is extended or adjusted under 35 U.S.C. 154(b) by 0 days.

(21) Appl. No.: 10/087,947

(22) Filed: Mar. 5, 2002

(65) Prior Publication Data

US 2002/0130066 A1 Sep. 19, 2002

(30) Foreign Application Priority Data

Mar. 13, 2001 (JP) .......................... 2001-070614

(51) Int. Cl.[7] ................................ B65H 1/00
(52) U.S. Cl. ........................ 221/197; 221/282
(58) Field of Search .................. 221/7, 9, 13, 129, 221/197, 123, 282, 283; 700/231, 237, 244; 53/168, 493

(56) References Cited

U.S. PATENT DOCUMENTS

| 5,671,592 A | 9/1997 | Yuyama et al. |
| 6,112,502 A | 9/2000 | Frederick et al. |

*Primary Examiner*—Kenneth W. Noland
(74) *Attorney, Agent, or Firm*—Wenderoth, Lind & Ponack, L.L.P.

(57) ABSTRACT

A medicine feeder apparatus comprising a plurality of cassettes each of which contains a different kind of medicine and a base portion on which the plurality of cassettes are mounted and which discharges the medicine in accordance with the prescription. the apparatus comprises an identification which is provided on each cassette, the identification showing information on the medicine contained in the cassette; a reader which is provided on the base portion, the reader reading the identification of the cassette during the cassette is mounted on the base portion; and a rock which is provided on the base portion, the rock preventing the cassette from being mounted. If the information of the medicine read from the identification by the reader does not coincide with a previously stored information, the rock is operated, while if coincide, the rock is released.

9 Claims, 4 Drawing Sheets

MEDICINE FEEDER APPARATUS

BACKGROUND OF THE INVENTION

Conventionally, a medicine feeder apparatus which automatically discharges medicine such as tablets, capsules, ampoules in accordance with a prescription has been used in a hospital or a pharmacy. The medicine feeder apparatus comprises a plurality of cassettes each of which contains a different kind of medicine and a base portion on which the plurality of cassettes are mounted and which discharges the medicine in accordance with the prescription. When the medicine in the cassette become shortage, the cassette is dismounted to replenish the cassette with the medicine and mounted back on the base portion, enabling a user to continually use the apparatus.

However, if the cassette replenished with the medicine is not returned to the original base portion but mounted on other base, the medicine which is different from that according to the prescription is discharged, resulting in a defective packing. Moreover, when an operator find that the different medicine has been discharged and stops the apparatus, some medicine may engage with a rotor etc. of the base portion, whereby a burdensome work that the medicine should be removed is necessary.

SUMMARY OF THE INVENTION

It is an object of the present invention to provide a medicine feeder apparatus which can prevent a mounting error of the cassette.

As a means to solve the aforementioned disadvantages, the present invention provides a medicine feeder apparatus comprising a plurality of cassettes each of which contains a different kind of medicine and a base portion on which the plurality of cassettes are mounted and which discharges the medicine in accordance with the prescription, the apparatus comprising:

an identification means which is provided on each cassette, the identification means showing information on the medicine contained in the cassette;

a read means which is provided on the base portion, the read means reading the identification means of the cassette during the cassette is mounted on the base portion; and a rock means which is provided on the base portion, the rock means preventing the cassette from being mounted, whereby if the information of the medicine read from the identification by the read means does not coincide with a previously stored information, the rock means is operated, while if coincide, the rock means is released.

According to the present invention, when the cassette is going to be mounted to a wrong position of the base portion, the read means reads the information of the medicine from the identification means of the cassette. Since the read information does not coincide with the previously stored information, the lock means can not be released. Thus, the cassette can not be mounted on the wrong position, preventing a mounting error of the cassette.

Preferably, the identification means may comprise a bar code showing the information of the medicine and the read means may comprise a bar code reader. Alternatively, it is also preferable that the identification means may comprise a memory for storing the information of the medicine and a radio receiver/transmitter and the read means may comprise a radio receiver/transmitter, whereby when the radio transmitter of the read means transmits a read signal, the radio receiver of the identification means receives the read signal and then the information of the medicine stored in the memory is transmitted through the radio transmitter of the identification means and received by the radio receiver of the read means.

Preferably, the rock means may comprise a solenoid and a claw piece which moves when energizing the solenoid, whereby the claw piece prevent the cassette from being mounted.

Alternatively, the rock means may comprise a rack provided on the cassette and a pinion provided on the base portion so that the pinion can engage with the rack, whereby as the cassette is mounted on the base portion, the rack comes into contact with the pinion to prevent the cassette from being mounted, while the pinion rotates to engage with the rack and move the cassette in a mounting direction to release the rock means.

BRIEF DESCRIPTION OF THE DRAWINGS

Other objects and features of the present invention will become clear from the following detail description with reference to the accompanying drawings in which.

DETAILED DESCRIPTION OF THE PREFERRED EMBODIMENTS

Figure 1:
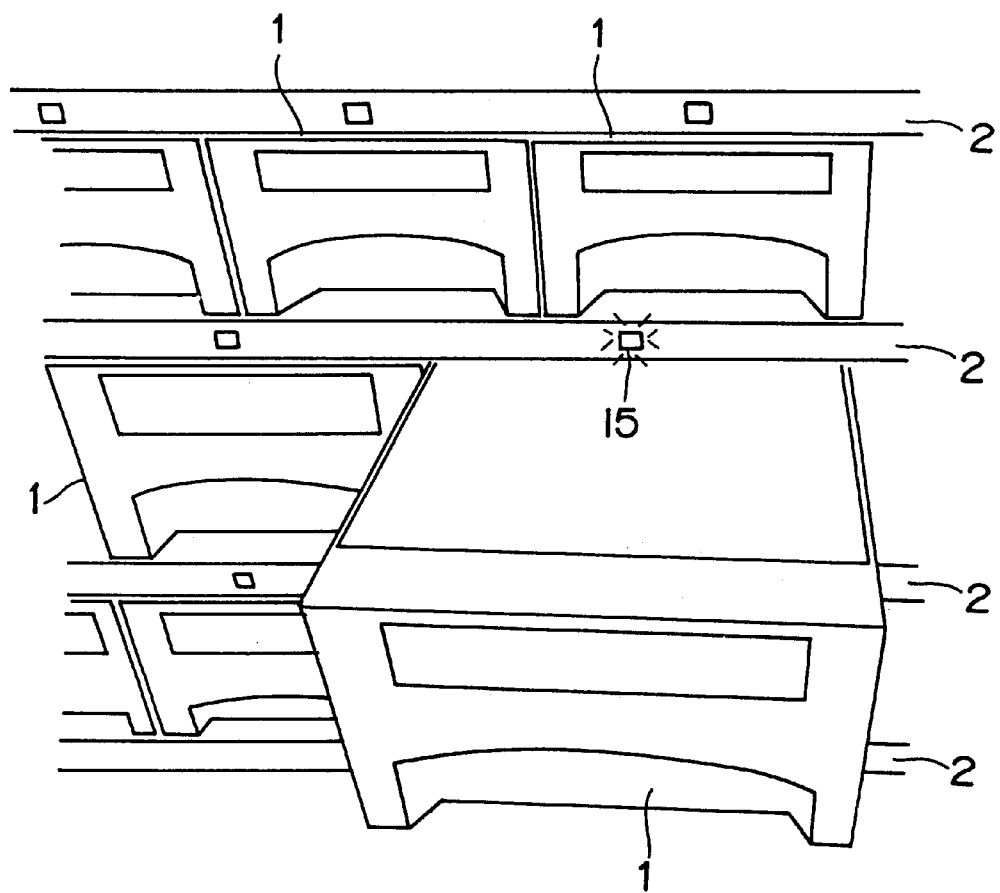
FIG. 1 is a perspective view showing a medicine feeder apparatus according to the present invention.

FIG. 1 shows an exterior of a medicine feeder apparatus according to the present invention. The medicine feeder apparatus comprises a plurality of cassettes 1 and shelf-like base portions 2 on which the cassettes 1 are mounted in a manner of drawers.

Figure 4:
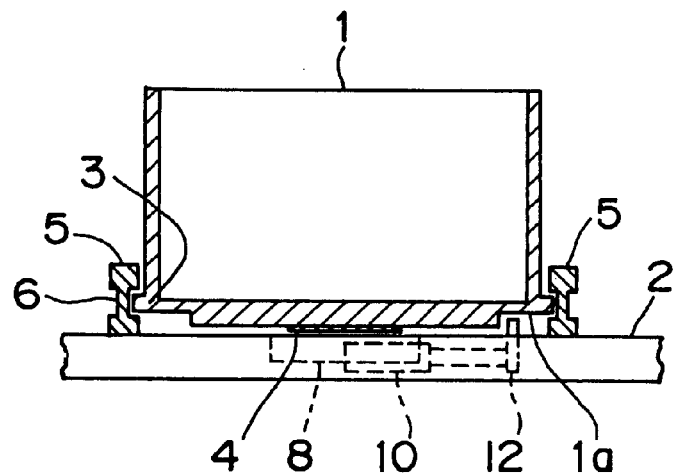
FIG. 4 is a sectional view taken along line IV—IV of FIG. 3.

Each of the cassettes 1 comprises a rectangular box-like container opened upwardly and contains a different kind of predetermined medicines inside. As shown in FIG. 4, guide projections 3 are formed on the both side surface. On the bottom surface of the cassette 1, at the slightly deep side, is stuck a bar code 4 showing an information on the medicine contained in the cassette 1. On the bottom of cassette 1 are formed cutouts 1a extending to the longitudinal direction in order to prevent the cassettes 1 from hitting against a claw piece 12 positioned at an unlock position. Inside the cassette 1 is provided a conveyor mechanism for conveying the medicine toward the deep side. The illustration of the conveyor mechanism is omitted because it is not related directly to the present invention.

Figure 3:
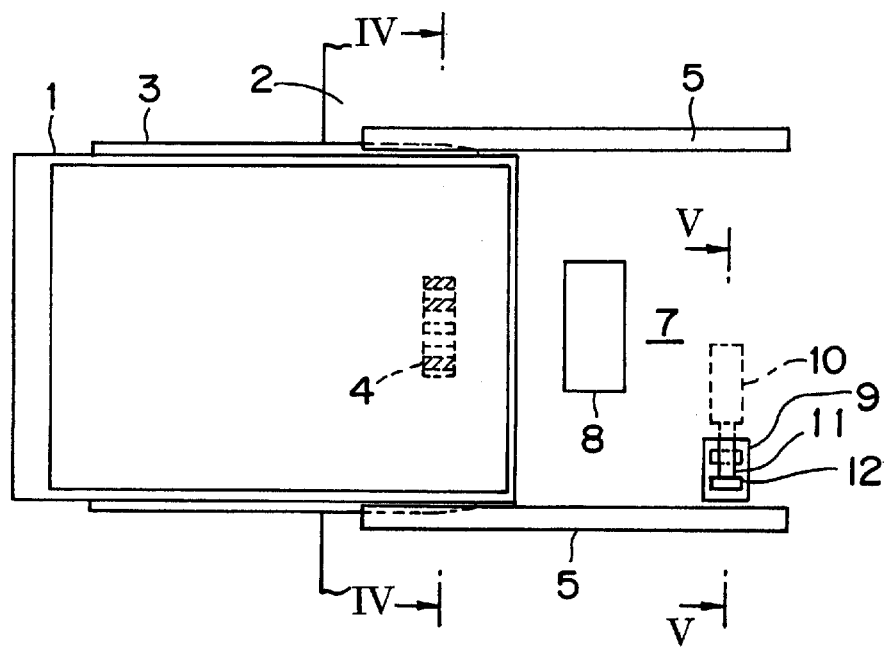
FIG. 3 is a plane view of the medicine feeder apparatus of FIG. 2.

Each of the base portion 2 comprises a multi-step shelves on which the number of cassettes 1 can be mounted both in the horizontal and perpendicular direction. On the base portions 2 and at the both sides of the mounting position of each cassettes 1, as shown in FIGS. 3 and 4, guide rails 5 are provided in the direction that the cassettes 1 are mounted and dismounted. Each of the guide rails 5 is formed with a guide groove 6 for guiding the guide projection 3 of the cassette 1. The space between the guide rails 5 constitutes a passage for mounting and dismounting the cassette 1. On the base portion 2 is provided a discharge mechanism for discharging the medicine conveyed from the cassette 1 into a bucket not shown. Both illustration and explanation of the discharge mechanism is omitted because it is not related directly to the present invention.

Figure 2:
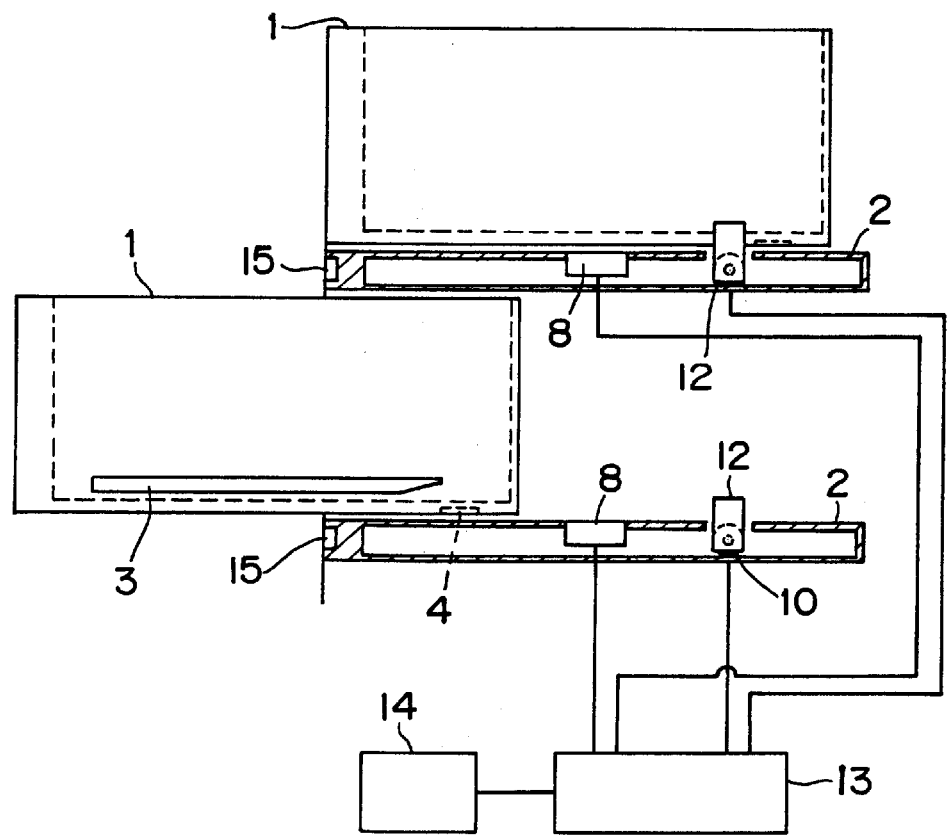
FIG. 2 is a view showing an outline construction of the medicine feeder apparatus of FIG. 1.
Figure 5:
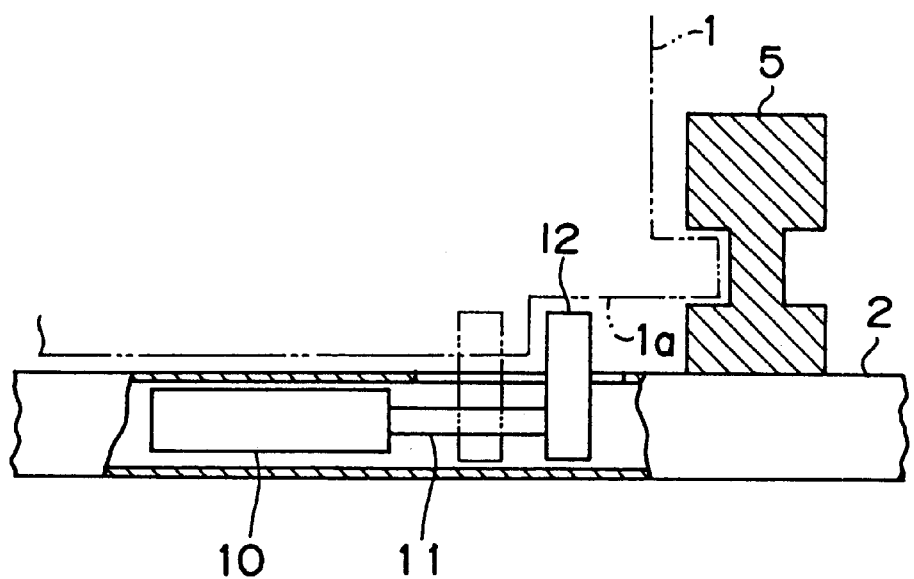
FIG. 5 is a enlarged sectional view taken along line V—V of FIG. 3.

Midway of the passage 7 of the base portion 2, as shown in FIGS. 2 and 3, there is provided a bar code reader 8 for reading the bar code 4 of the cassette 1. At the downstream side of the mounting direction of the cassette 1 with respect to the position of the bar code reader 8, there is formed an opening 9 from which the claw piece 12 fitted on the tip end of a plunger of a solenoid 10 protrudes upwardly. The claw piece 12 is positioned at an unlock position as shown in a solid line when the solenoid 10 is OFF and it moves to a lock position as shown in a two-dots chain line when the solenoid 10 is ON. As shown in FIG. 5, the unlock position of the claw piece 12 is in a position opposing to the cutout 1a of the cassette 1 so that the claw piece 12 is not obstructive for the cassette 1 to be inserted to a mount position. The lock position of the claw piece is in a position apart from the cutout 1a of the cassette 1 so that the claw piece 12 engages with the front end of the cassette 1 to be mounted to prevent the insertion of the cassette 1.

Numeral 13 denotes a control unit for controlling ON and OFF of the solenoid 10 based on the medicine information of the bar code 4 read by the bar code reader 8. The control unit 13 includes a memory 14 in which an information of the medicine contained in the cassette 1 to be mounted on each base portion 2 is stored.

Operation when mounting and dismounting the cassette 1 in the medicine containing and tanking out apparatus having the above described construction will be explained hereinafter.

When the medicine in the cassette become shortage, a lamp 15 provided on the front surface of the base portion 2 is lit to notify a user of a shortage of medicine. Locking at the light of the lamp 15, the user can draw the corresponding cassette 1 as shown in FIG. 1 to replenish the cassette 1 with the medicine.

After replenishing the cassette 1 with the medicine, when the deep side of the cassette 1 is inserted and pushed into the original base portion 2, the guide projections 3 of the cassette 1 engage with and slide on the guide grooves 6 of the guide rails 5 of the base portion 2, whereby the cassette 1 is guided to the mounting position. Midway to the mounting position, the bar code 4 of the cassette 1 is read by the bar code reader 8 of the base portion 2. If the information of the medicine read by the bar code reader 8 coincides with the information previously stored in the memory 14, then the control unit 13 does not energize the solenoid 10 and maintains it OFF. Thus, as shown in a solid line in FIG. 5, as the claw piece 12 retreats to the unlock position where it is opposed to the cutout 1a of the cassette 1, the cassette 1 is guided to the mounting position without being blocked by the claw projection 12 and surely mounted thereon. As a result, the discharge operation of the medicine from the cassette 1 would be possible.

On the contrary, if the information of the medicine read by the bar code reader 8 does not coincide with the information previously stored in the memory 14, then the control unit 13 energizes the solenoid 10 and makes it ON. Thus, as shown in a two-dots chain line in FIG. 5, as the claw piece 12 moves to the lock position where it is positioned apart from the cutout 1a of the cassette 1, the cassette 1 is blocked by the claw projection 12. To do this end, the user can not push the cassette 1 any more and can not mount the cassette 1. As a result, the user realizes that the cassette 1 was inserted to the wrong position and can immediately remount the cassette 1 on the correct position. Thus, according to the medicine feeder apparatus of the present invention, a mounting error of the cassette 1 can be surely prevented.

In the aforementioned embodiment, although the bar code 4 is provided as the identification means of the cassette 1 and the bar code reader 8 is provided as the reading means, the present invention is not limited to these. Many kinds of identification means can be used. For example, as the identification means, a few figures of identification comprising presence and non-presence of perforation corresponding to the medicine information may be provided so that the identification is irradiated with a light and the medicine information is read based on presence and non-presence of reflection.

Alternatively, as the identification means, a transponder with a memory for storing the medicine information and a radio receiver/transmitter may be fixed the cassette 1 while as the reading means, a radio receiver/transmitter may be fixed on the base portion 2. In this case, when the radio transmitter of the base portion 2 transmits a read signal as the cassette 1 is mounted, the radio receiver fixed on the cassette 1 receives the read signal. Then, the medicine information stored in the memory is transmitted through the radio transmitter of the transponder and received by the radio receiver of the base portion 2.

Furthermore, in the aforementioned embodiment, although the claw projection and the solenoid are provided as the rock means, the present invention is not limited to these and all kinds of mechanism can be used.

Figure 6:
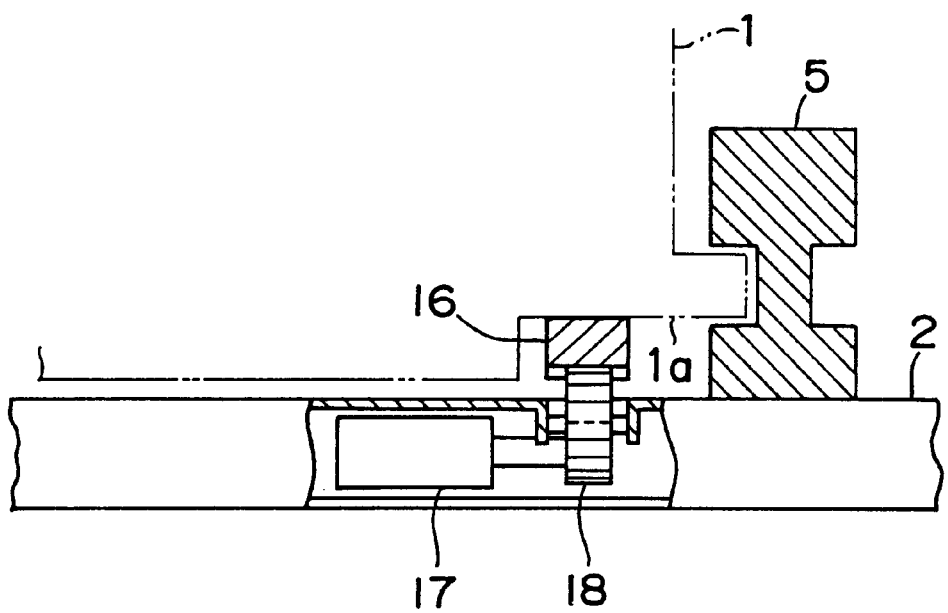
FIG. 6 is a sectional view similar to FIG. 5 showing another example of lock means.

For example, as shown in FIG. 6, a rack 16 may be provided on the cutout 1a of the bottom surface of the cassette 1 in a longitudinal direction while a pinion 18 which is engaged with the rack 16 and is driven to rotate by the motor 17 may be provided on the base portion 2 so that the rack 16 and the pinion 18 constitute the rock means. In this embodiment, the rack 16 and the pinion 18 are arranged so that the leading end of the rack 16 comes into contact with the pinion 18 when the cassette 1 is inserted to some extent and the bar code 4 is read by the bar code reader 8. If the information of the medicine read by the bar code reader 8 coincides with the information previously stored in the memory 14, then the pinion 18 is rotated, while if not coincide, the pinion 18 is not rotated. Thus, in the case that the cassette 1 is inserted into the correct position, as the pinion 18 is rotated and engaged with the rack 16, the cassette 1 is moved in a mounting direction and becomes unlocked state, allowing the cassette 1 to be automatically mounted at the mounting position. On the contrary, in the case that the cassette 1 is inserted into the wrong position, as the pinion 18 is not rotated, the leading end of the rack 16 comes into contact with the pinion 18. Thus, the cassette 1 becomes rocked state, preventing the cassette 1 from being mounted.

Although the present invention has been fully described by way of the examples with reference to the accompanying drawing, it is to be noted that here that various changes and modifications will be apparent to those skilled in the art. Therefore, unless such changes and modifications otherwise depart from the spirit and scope of the present invention, they should be construed as being included therein.

What is claimed is:

1. A medicine feeder apparatus comprising a plurality of cassettes each of which contains a different kind of medicine and a base portion on which the plurality of cassettes are mounted and which discharges the medicine in accordance with the prescription, the apparatus comprising:

an identification means which is provided on each cassette, the identification means showing information on the medicine contained in the cassette;

a read means which is provided on the base portion, the read means reading the identification means of the cassette during the cassette is mounted on the base portion; and a rock means which is provided on the base portion, the rock means preventing the cassette from being mounted, whereby if the information of the medicine read from the identification by the read means does not coincide with a previously stored information, the rock means is operated, while if coincide, the rock means is released.

2. The apparatus as in claim 1, wherein the identification means comprises a bar code showing the information of the medicine and the read means comprises a bar code reader.

3. The apparatus as in claim 1, wherein the identification means comprises a memory for storing the information of the medicine and a radio receiver/transmitter and the read means comprises a radio receiver/transmitter, whereby when the radio transmitter of the read means transmits a read signal, the radio receiver of the identification means receives the read signal and then the information of the medicine stored in the memory is transmitted through the radio transmitter of the identification means and received by the radio receiver of the read means.

4. The apparatus as claimed in claim 1, wherein the rock means comprises a solenoid and a claw piece which moves when energizing the solenoid, whereby the claw piece prevent the cassette from being mounted.

5. The apparatus as in claimed in claim 1, wherein the rock means comprises a rack provided on the cassette and a pinion provided on the base portion so that the pinion can engage with the rack, whereby as the cassette is mounted on the base portion, the rack comes into contact with the pinion to prevent the cassette from being mounted, while the pinion rotates to engage with the rack and move the cassette in a mounting direction to release the rock means.

6. The apparatus as claimed in claim 2, wherein the rock means comprises a solenoid and a claw piece which moves when energizing the solenoid, whereby the claw piece prevent the cassette from being mounted.

7. The apparatus as claimed in claim 3, wherein the rock means comprises a solenoid and a claw piece which moves when energizing the solenoid, whereby the claw piece prevent the cassette from being mounted.

8. The apparatus as in claimed in claim 2, wherein the rock means comprises a rack provided on the cassette and a pinion provided on the base portion so that the pinion can engage with the rack, whereby as the cassette is mounted on the base portion, the rack comes into contact with the pinion to prevent the cassette from being mounted, while the pinion rotates to engage with the rack and move the cassette in a mounting direction to release the rock means.

9. The apparatus as in claimed in claim 3, wherein the rock means comprises a rack provided on the cassette and a pinion provided on the base portion so that the pinion can engage with the rack, whereby as the cassette is mounted on the base portion, the rack comes into contact with the pinion to prevent the cassette from being mounted, while the pinion rotates to engage with the rack and move the cassette in a mounting direction to release the rock means.

\* \* \* \* \*

UNITED STATES PATENT AND TRADEMARK OFFICE
CERTIFICATE OF CORRECTION

PATENT NO.     : 6,616,010 B2
DATED          : September 9, 2003
INVENTOR(S)    : Shoji Yuyama et al.

It is certified that error appears in the above-identified patent and that said Letters Patent is hereby corrected as shown below:

<u>Title page,</u>
Item [73], Assignee, change "YuYama Mfg. Co., Ltd." to -- Yuyama Mfg. Co., Ltd. --.
Item [*] Notice:, change "U.S.C. 154(b) by 0 days." to -- U.S.C. 154(b) by 31 days. --.
Item [57], ABSTRACT,
Line 5, change "the apparatus" to -- The apparatus --.
Lines 10, 11, 14 and 15, change "rock" to -- lock --.

<u>Column 1,</u>
Lines 41, 42, 45 and 46, change "rock" to -- lock --.

<u>Column 2,</u>
Lines 8, 12 and 19, change "rock" to -- lock --.

<u>Column 4,</u>
Lines 33 and 39, change "rock" to -- lock --.
Line 56, change "rocked" to -- locked --.

<u>Column 5,</u>
Lines 14, 15, 18, 19 and 35, change "rock" to -- lock --.

<u>Column 6,</u>
Lines 4, 10 and 11, change "rock" to -- lock --.
Lines 15, 20, 26, 28 and 34, change "rock" to -- lock --.

Signed and Sealed this

Second Day of March, 2004

JON W. DUDAS
*Acting Director of the United States Patent and Trademark Office*